US006522490B1

(12) United States Patent
Cates et al.

(10) Patent No.: US 6,522,490 B1
(45) Date of Patent: Feb. 18, 2003

(54) SERVO WRITER HAVING SLANTED TIMING PATTERN READ AND WRITE HEADS

(75) Inventors: James C. Cates, Louisville, CO (US); Yung Yip, Afton, MN (US)

(73) Assignees: Storage Technology Corporation, Louisville, CO (US); Imation Corporation, Oakdale, MN (US)

( * ) Notice: Subject to any disclaimer, the term of this patent is extended or adjusted under 35 U.S.C. 154(b) by 0 days.

(21) Appl. No.: 09/452,903

(22) Filed: Dec. 1, 1999

(51) Int. Cl.[7] .............................................. G11B 5/147
(52) U.S. Cl. ........................ 360/48; 360/121; 360/126
(58) Field of Search ........................... 360/48, 327.24, 360/122, 119, 123, 51, 57, 77.12, 125, 75, 110, 126, 121

(56) References Cited

U.S. PATENT DOCUMENTS 5,572,392 A * 11/1996 Aboaf et al. ............... 360/126
6,236,525 B1 * 5/2001 Cates et al. .................. 360/51

* cited by examiner

Primary Examiner—David Hudspeth
Assistant Examiner—Varsha N. Kapadia
(74) Attorney, Agent, or Firm—Brooks & Kushman P.C.

(57) ABSTRACT

A magnetic servo write head incorporates timing pattern read and write heads that are non-symmetrically slanted relative to an adjacent servo write head to improve timing pattern detection for a timing pattern written at an edge of a magnetic storage media. The slanted orientation of the timing write and read heads provides optimized timing pattern location and track width on a magnetic tape, while also allowing a sufficient number of windings to be used on an associated coil to improve overall signal-to-noise ratio.

16 Claims, 2 Drawing Sheets

SERVO WRITER HAVING SLANTED TIMING PATTERN READ AND WRITE HEADS

TECHNICAL FIELD

The present invention generally relates to magnetic read and write heads used to read and write information in tracks on a magnetic recording medium such as a tape, and more particularly, to a servo writer having optimized utilization of head space without compromising track width or signal-to-noise ratio characteristics.

BACKGROUND ART

Generally, narrow, multi-track magnetic recording devices have been developed as a way of increasing data density storage capacity for a tape media. However, because the lateral spacing of the tracks is very small, servo systems have been developed to record servo pattern/tracking data onto a tape which can be read during use of the tape by a recording device to allow precise positioning control of the data read and write heads relative to the tape. The servo pattern is typically formed as a sequence of frequencies recorded on predetermined areas of a tape, and allow a servo reader to accurately reference track location.

As shown in FIGS. 1 and 2, a servo write head arrangement 10 was developed by the assignee of the present invention to utilize four modules 12 through 18 to provide high tolerance placement of the servo pattern in a single pass of the tape. Each module includes a plurality of servo write heads located in the same gap line, each of which is arranged to operate in conjunction with similarly arranged servo write heads located on the remaining modules to form individual, parallel servo tracks on the tape. In this servo head design, a timing pattern write or read head is located in each module gap line between the servo write heads and the edges of the tape.

More specifically, as best seen in FIG. 2, a first module 12 includes a timing pattern writer 20 formed in the same gap line as a wide leading writer 22. While only one end/edge is shown in FIG. 2 for clarity of description, it is to be understood that each module is similarly arranged with an appropriate timing pattern writer or reader at the other edge. Referring again to FIG. 2, a second module 14 includes a timing reader 24 and a first servo erase writer 26, and a third module 16 includes a timing reader 28 and a second servo erase writer 30. A fourth module 18 includes a timing reader 32 and a track identification writer 34. As noted above, each timing writer/reader is located between the edge of the tape and the servo writers. Each head includes a top and bottom pole respectively designated as 36 and 38.

In operation, a tape is moved past the servo writer head as indicated by the arrow. Each track of the servo pattern is formed from the combined operations of the leading edge writer, erase writers, and track identification writer. In this servo writer arrangement, placement of the timing pattern write and read heads between the servo write heads and the edges of the tape is advantageous because data is not typically recorded in the outer edge regions of the tape. Thus, overall utilization of the tape width is improved.

However, placement of the timing pattern at the edges of the tape is also problematic because the edges of the tape are the most susceptible area for tape guiding problems. Unfortunately, because typical timing pattern write and inductive read heads are formed with symmetry down the center of the head and include coils that flare around the back gap area of the head, these heads are limited in how close they can be placed to the adjacent servo write heads. Thus, placement of the timing pattern heads is forced to be closer to the tape edge, thereby potentially exasperating the tape edge problem.

In addition, in order to improve signal-to-noise ratio of the signal used for the timing pattern, it is desirable to maximize track width as well as the number of windings for each timing pattern head. Again, because of the symmetrical layout, these factors must be compromised in order to position the timing heads as close as possible to the servo write heads. As a result, a need exists for a servo writer arrangement which allows closer placement of timing pattern read and write heads to the servo heads without compromising track width or signal-to-noise ratio characteristics.

DISCLOSURE OF THE INVENTION

It is therefore an object of the present invention to provide a servo writer having a head arrangement which permits reading and writing of timing pattern data at an edge of a magnetic recording medium while minimizing the impact of possible tape guiding errors attendant with utilizing the edges for writing and reading of such timing pattern data.

It is another object of the present invention to provide a magnetic head design having signal readers and writers arranged to provide optimized signal location and width on a magnetic recording medium without compromising the number of coil windings that can be wound on associated inductive read/write heads.

It is another object of the present invention to provide a servo writer having timing pattern readers and writers arranged to provide optimized timing pattern location and width without compromising the number of coil windings that can be wound on the timing pattern read/write heads.

In accordance with these and other objects, the present invention provides a servo writer for writing servo tracking signals on a multi-track recording medium having a first servo write head positioned to form a servo track on the recording medium, and a timing pattern write head positioned adjacent the first servo write head so as to form a timing signal track on the recording medium between the servo track and an edge surface of the recording medium, wherein the timing pattern write head is formed having a top and bottom pole asymmetrically oriented relative to the center of the head so as to slant the recording gap of the head toward the servo write head and away from the edge surface of the recording medium.

In accordance with one aspect of the present invention, the servo writer further includes a second servo write head positioned to write signals on the servo track formed by the first servo write head, and a timing pattern inductive read head positioned adjacent the second servo write head so as to read the timing signal formed by the timing pattern write head, wherein the timing pattern read head is formed having a top and bottom pole asymmetrically oriented relative to the center of the head so as to slant the read gap of the head toward the second servo write head and away from the edge surface of the recording medium.

In accordance with another aspect of the present invention, a second timing pattern write head is positioned in the same gap line as the other timing pattern write head so as to form a timing signal track along the other edge surface of the recording medium, wherein the second timing pattern write head comprises a top and bottom pole having an asymmetrical orientation relative to the center of the head so as to slant the recording gap of the head away from the other edge surface. One or more additional timing pattern inductive read heads can also be positioned so as read the timing signal track along the other edge surface of the recording medium. These inductive read heads are also formed with a top and bottom pole having an asymmetrical orientation relative to the center of the head so as to slant the read gap of the head away from the other edge surface.

In accordance with still another aspect of the present invention, a timing pattern write head for use in a servo writer to form a timing signal track on a recording medium between a servo track and an edge surface of the recording medium includes a top and bottom pole having an asymmetrical orientation relative to the center of the head so as to slant the recording gap of the head away from the edge of the recording medium. The asymmetrical orientation further positions a back gap layer away from an adjacent servo write head so as to maximize head space available for a coil, thereby allowing the number of turns on the coil to be as large as possible.

In accordance with yet another aspect of the present invention, a timing pattern inductive read head for use in a servo writer to read a previously recorded timing signal track on a recording medium between a servo track and an edge surface of the recording medium includes a top and bottom pole having an asymmetrical orientation relative to the center of the head so as to slant the read gap of the head away from the edge of the recording medium. The asymmetrical orientation further positions a back gap layer away from an adjacent servo write head so as to maximize head space available for a coil, thereby allowing the number of turns on the coil to be as large as possible.

In accordance with yet a further aspect of the present invention, an inductive head for writing and reading signals on a multi-track recording medium is provided having a first head aligned with a first signal track on the recording medium, and a second head positioned adjacent the first head and aligned with a different signal track on the recording medium adjacent the first signal track. The second head includes a top and bottom pole having an asymmetrical orientation relative to the center of the head so as to slant a recording gap of the second head toward the first head. The asymmetrical orientation also positions a back gap layer away from the first head so as to maximize head space available for a coil formed on the second head, thereby allowing the number of turns on the coil to be as large as possible.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
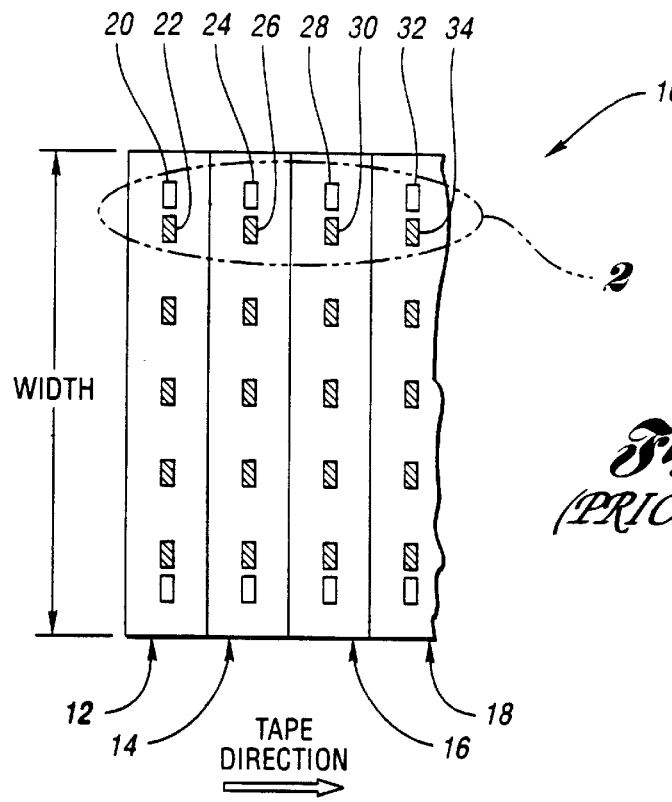
FIG. 1 shows an exemplary four module servo write head having timing writers and readers.
Figure 2:
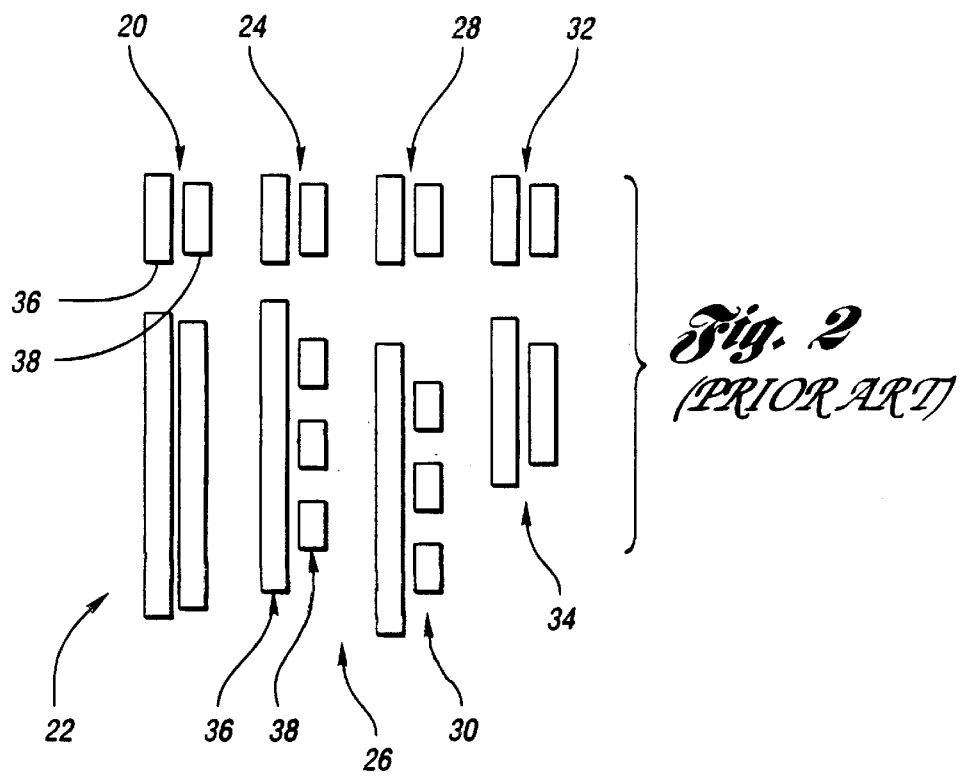
FIG. 2 is a detailed representation of the servo head of FIG. 1 showing placement of one set of timing reader and writers relative to a set of adjacent servo writer heads.
Figure 3:
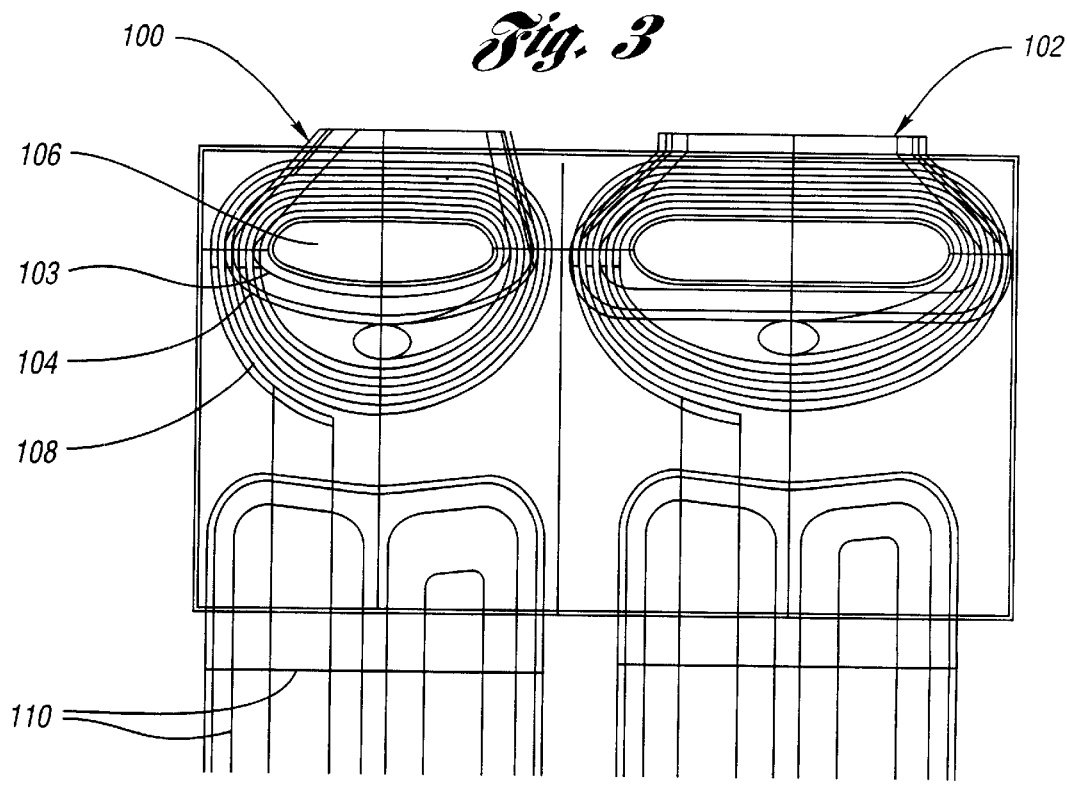
FIG. 3 is a mask drawing showing a slanted timing write head adjacent a servo write head in accordance with the present invention.

Referring to FIG. 3, a mask drawing shows a timing write head 100 in accordance with the present invention. Timing write head 100 is located in a gap line adjacent a servo write head designated as 102. When applied to the four module servo writer arrangement 10 of FIGS. 1 and 2, servo write head 102 would operate as leading writer 22. Timing write head 100 includes a top pole 103, bottom pole 104, and back gap layer 106. The back gap layer is made wider than the track width, such as a 1.5 to 1 ratio. A set of coils 108 are formed by a plurality of windings wrapped between the poles and about the back gap layer. It is desirable to use as many turns as possible to improve The coils are connected to a set of leads 110.

In accordance with the present invention, the timing write head is slanted toward the adjacent the servo write head. More specifically, the top and bottom pole are asymmetrically oriented relative to the center of the head so as to position the back gap layer away from the adjacent servo head 102 toward the edge of the tape, i.e., to left of the two heads shown in FIG. 3, while at the same time slanting the top or recording gap of the head closer to servo write head 102. At the other end of the gap line, the slant of the timing pattern write head would be reversed.

With such an asymmetrical timing pattern write head orientation, the position of the timing pattern track is moved away from the edge of the tape.

Figure 4:
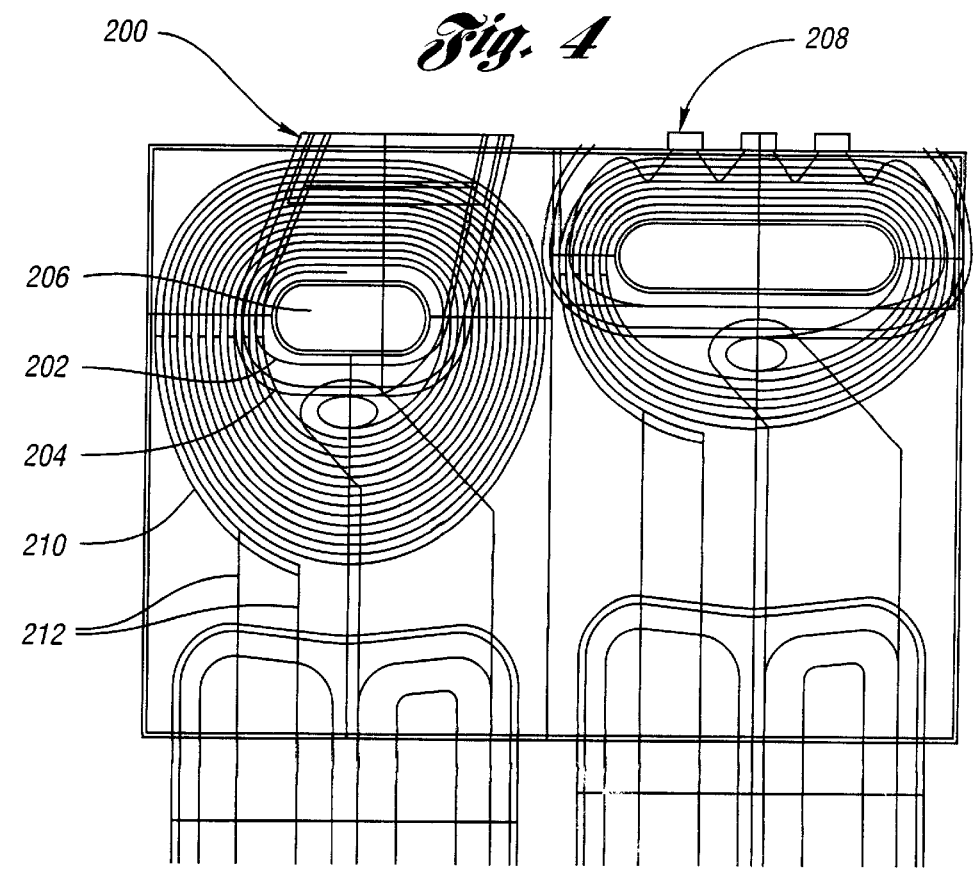
FIG. 4 is a mask drawing showing a slanted timing inductive read head adjacent a servo write head in accordance with the present invention.

Referring to FIG. 4, a mask drawing shows a timing pattern inductive read head 200 having a slanted/asymmetrical orientation relative to the center of the head in accordance with the present invention. Timing pattern inductive read head 200 includes a top pole 202, bottom pole 204, and back gap layer 206. The timing pattern read head is shown as being positioned in a gap line adjacent to a split top servo write head 208. A coil 210 is wound about the back gap layer, and is connected to a set of leads 212.

As with timing pattern write head 100, top and bottom poles 202 and 204 are asymmetrically oriented relative to the center of the head so as to position the back gap layer away from the adjacent servo head toward the edge of the tape, while at the same time slanting the read gap of the head closer to servo write head. Thus, the present invention simultaneously optimizes timing pattern location, timing pattern track width, and the number of coil turns in the reader to significantly improve overall timing pattern detection, signal-to-noise ratio, and timing pattern detection reliability.

While a four module servo writer head is shown, it will be understood that such an arrangement is merely illustrative of one embodiment of the present invention, and is not to be construed as limiting. In general, the present invention can be advantageously used to fabricate a servo writer having only one timing pattern read head, one timing pattern write head, and one servo write head. In addition, the use of an asymmetrical write or read head orientation is not limited to a servo writer embodiment as described above. In accordance with the present invention, asymmetrical orientation can be used in any type of inductive head design so as to improve signal location and track width for signals recorded on a magnetic recording medium without compromising the number of coil windings that can be wound on the associated read/write heads. Thus, while the best mode for carrying out the invention has been described in detail, those familiar with the art to which this invention relates will recognize various alternative designs and embodiments for practicing the invention as defined by the following claims.

What is claimed is:

1. An apparatus for writing servo tracking signals on a multi-track recording medium comprising:

a first servo write head positioned to form a servo track on the recording medium; and a timing pattern write head positioned adjacent the first servo write head so as to form a timing signal track on the recording medium between the servo track and an edge surface of the recording medium, wherein the timing pattern write head comprises a top and bottom pole having an asymmetrical orientation relative to the center of the head so as to slant a recording gap of the timing pattern write head toward the servo write head.

2. The apparatus of claim 1 further comprising a second servo write head positioned to write signals on the servo track formed by the first servo write head, and a timing pattern read head positioned adjacent the second servo write head so as to read the timing signal formed by the timing pattern write head, wherein the timing pattern read head comprises a top and bottom pole having an asymmetrical orientation relative to the center of the head so as to slant a read gap of the timing pattern read head toward the second servo write head.

3. The apparatus of claim 2 wherein the second servo write head comprises an erase frequency writer.

4. The apparatus of claim 2 wherein the second servo write head comprises a track identification writer.

5. The apparatus of claim 2 further comprising a second timing pattern read head positioned in a gap line of the other timing pattern read head so as to read a timing signal track along the other edge surface of the recording medium, wherein the second timing pattern read head comprises a top and bottom pole having an asymmetrical orientation relative to the center of the head so as to slant the read gap of the second timing pattern read head away from the other edge surface.

6. The apparatus of claim 1 further comprising at least one additional servo write head positioned in-line relative to the first servo write head to form at least one additional servo track parallel to the servo track formed by the first servo write head; and a second timing pattern write head positioned adjacent an end one of the at least one additional servo write heads so as to form a timing signal track on the recording medium between the at least one additional servo track and the other edge surface of the recording medium, wherein the second timing pattern write head comprises a top and bottom pole having an asymmetrical orientation relative to the center of the head so as to slant the recording gap of the second timing pattern head toward the adjacent end servo write head.

7. The apparatus of claim 6 further comprising a second servo write head positioned to write signals on the servo track formed by the first servo write head, and a timing pattern read head positioned adjacent the second servo write head so as to read the timing signal formed by the timing pattern write head, wherein the timing pattern read head comprises a top and bottom pole having an asymmetrical orientation relative to the center of the head so as to slant the read gap of the head toward the second servo write head.

8. The apparatus of claim 7 further comprising a second timing pattern read head positioned in a gap line of the other timing pattern read head so as to read the timing signal track formed by the second timing pattern write head, wherein the second timing pattern read head comprises a top and bottom pole having an asymmetrical orientation relative to the center of the head so as to slant the read gap of the head away from the other edge surface.

9. The apparatus of claim 1 further comprising a second timing pattern write head positioned in a gap line of the other timing pattern write head so as to form a timing signal track along the other edge surface of the recording medium, wherein the second timing pattern write head comprises a top and bottom pole having an asymmetrical orientation relative to the center of the head so as to slant the recording gap of the second timing pattern write head away from the other edge surface.

10. The apparatus of claim 1 wherein the first servo write head comprises a leading writer.

11. The apparatus of claim 1 wherein the asymmetrical orientation further positions a back gap layer away from the first servo write head so as to maximize head space available for a coil, thereby allowing the number of turns on the coil to be as large as possible.

12. A timing pattern write head for use in a servo writer to form a timing signal track on a recording medium between a servo track and an edge surface of the recording medium, said timing pattern write head comprising:

a top and bottom pole having an asymmetrical orientation relative to the center of the head so as to slant a recording gap of the head away from the edge of the recording medium.

13. The timing pattern write head of claim 12 wherein the asymmetrical orientation further positions a back gap layer away from an adjacent servo write head so as to maximize head space available for a coil, thereby allowing the number of turns on the coil to be as large as possible.

14. A timing pattern read head for use in a servo writer to read a timing signal track previously written on a recording medium between a servo track and an edge surface of the recording medium, said timing pattern read head comprising:

a top and bottom pole having an asymmetrical orientation relative to the center of the head so as to slant a read gap of the head away from the edge of the recording medium.

15. The timing pattern read head of claim 14 wherein the asymmetrical orientation further positions a back gap layer away from an adjacent servo write head so as to maximize head space available for a coil, thereby allowing the number of turns on the coil to be as large as possible.

16. The timing pattern write head of claim 12 wherein the asymmetrical orientation further positions a back gap layer away from the first head so as to maximize head space available for a coil formed on the second head, thereby allowing the number of turns on the coil to be as large as possible.

* * * * *